(12) United States Patent
Whalin et al.

(10) Patent No.: US 10,503,377 B2
(45) Date of Patent: Dec. 10, 2019

(54) DYNAMIC STATUS INDICATOR

(71) Applicant: Facebook, Inc., Menlo Park, CA (US)

(72) Inventors: Gregory Paul Whalin, Brooklyn, NY (US); Tuduyen Ann Nguyen, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 147 days.

(21) Appl. No.: 14/551,228

(22) Filed: Nov. 24, 2014

(65) Prior Publication Data

US 2016/0147421 A1    May 26, 2016

(51) Int. Cl.
*G06F 3/0484* (2013.01)
*G06Q 10/10* (2012.01)
*G06Q 50/00* (2012.01)

(52) U.S. Cl.
CPC ...... *G06F 3/04847* (2013.01); *G06F 3/04842* (2013.01)

(58) Field of Classification Search
CPC . G06F 3/04847; G06F 3/04842; G06Q 10/10; H04L 57/10
See application file for complete search history.

(56) References Cited

U.S. PATENT DOCUMENTS

| | | | |
|---|---|---|---|
| 6,938,214 B2 * | 8/2005 | Proulx | G06F 3/0481 715/763 |
| 7,475,072 B1 * | 1/2009 | Ershov | G06F 16/9535 |
| 8,327,012 B1 | 12/2012 | Nguyen | |
| 8,521,661 B2 | 8/2013 | Wang | |
| 8,726,182 B1 * | 5/2014 | Murphy | G06F 3/04817 715/772 |
| 8,762,462 B1 * | 6/2014 | Duddu | H04L 51/18 709/204 |
| 9,042,912 B1 | 5/2015 | Bunner | |
| 9,082,129 B2 | 7/2015 | Dhawan | |
| 9,324,114 B2 | 4/2016 | Votaw | |
| 9,338,242 B1 * | 5/2016 | Suchland | H04L 67/22 |
| 2005/0222965 A1 * | 10/2005 | Chaudhuri | G06F 16/217 |
| 2006/0047649 A1 * | 3/2006 | Liang | G06F 16/338 |
| 2006/0112084 A1 * | 5/2006 | McBeath | G06F 16/382 |
| 2007/0255617 A1 | 11/2007 | Maurone | |
| 2009/0281718 A1 | 11/2009 | Gibran | |
| 2010/0161733 A1 | 6/2010 | Bower | |
| 2011/0004831 A1 | 1/2011 | Steinberg | |
| 2011/0083101 A1 | 4/2011 | Sharon | |

(Continued)

OTHER PUBLICATIONS

Final Office Action for U.S. Appl. No. 14/551,179, filed Apr. 13, 2017.

(Continued)

*Primary Examiner* — Justin R. Blaufeld
(74) *Attorney, Agent, or Firm* — Baker Botts L.L.P.

(57) ABSTRACT

In one embodiment, a method includes receiving user input indicating a user's intent to generate social-network content. The social network includes a number of nodes and a number of edges connecting the nodes, with at least one node corresponding to the first user. The method includes providing for presentation to the user an indicator, the indicator indicating one or more of: 1) that suggested content for the user to associate with the social networking system exists, the suggestion associated with a quality that exceeds a threshold quality; or 2) that whether the suggestion exists is being determined.

17 Claims, 10 Drawing Sheets

(56) References Cited

U.S. PATENT DOCUMENTS

| | | |
|---|---|---|
| 2011/0179024 A1* | 7/2011 | Stiver ............... G06F 16/24578 707/728 |
| 2011/0184768 A1 | 7/2011 | Norton |
| 2012/0047025 A1* | 2/2012 | Strohman .......... G06Q 30/0275 705/14.71 |
| 2012/0076367 A1 | 3/2012 | Tseng |
| 2012/0124176 A1 | 5/2012 | Curtis |
| 2012/0150955 A1 | 6/2012 | Tseng |
| 2012/0166532 A1 | 6/2012 | Juan |
| 2012/0166964 A1 | 6/2012 | Tseng |
| 2012/0227077 A1* | 9/2012 | Spivack ............. G06F 16/9535 725/110 |
| 2012/0233158 A1* | 9/2012 | Braginsky ............... H04L 67/18 707/724 |
| 2012/0252418 A1 | 10/2012 | Kandekar |
| 2012/0304087 A1 | 11/2012 | Walkin |
| 2012/0308077 A1 | 12/2012 | Tseng |
| 2013/0031489 A1 | 1/2013 | Gubin |
| 2013/0035114 A1 | 2/2013 | Holden |
| 2013/0041653 A1 | 2/2013 | Tseng |
| 2013/0045758 A1 | 2/2013 | Khorashadi |
| 2013/0066821 A1 | 3/2013 | Moore |
| 2013/0066963 A1 | 3/2013 | Odio |
| 2013/0066964 A1 | 3/2013 | Odio |
| 2013/0095801 A1 | 4/2013 | Kermoian |
| 2013/0147820 A1 | 6/2013 | Kalai |
| 2013/0159403 A1 | 6/2013 | Zigoris |
| 2013/0198281 A1 | 8/2013 | Scuba |
| 2013/0227011 A1 | 8/2013 | Sharma |
| 2013/0227431 A1 | 8/2013 | Vasudevan |
| 2013/0237254 A1 | 9/2013 | Papakipos |
| 2013/0252594 A1 | 9/2013 | Faillaci |
| 2013/0268886 A1 | 10/2013 | Sureshkumar |
| 2013/0325855 A1* | 12/2013 | Kapicioglu ............. H04L 67/18 707/724 |
| 2013/0332525 A1 | 12/2013 | Liu |
| 2013/0332855 A1* | 12/2013 | Roman ................. G06F 16/176 715/753 |
| 2014/0012918 A1 | 1/2014 | Chin |
| 2014/0032109 A1 | 1/2014 | Hsieh |
| 2014/0040228 A1* | 2/2014 | Kritt .................... G06F 16/248 707/706 |
| 2014/0067828 A1 | 3/2014 | Archibong |
| 2014/0095607 A1 | 4/2014 | Fraccaroli |
| 2014/0108333 A1 | 4/2014 | Jain |
| 2014/0108526 A1 | 4/2014 | Garcia-Barrio |
| 2014/0156387 A1 | 6/2014 | Bruich |
| 2014/0164511 A1 | 6/2014 | Williams |
| 2014/0171119 A1 | 6/2014 | Fraccaroli |
| 2014/0189002 A1 | 7/2014 | Orioli |
| 2014/0221013 A1 | 8/2014 | Vaccari |
| 2014/0222912 A1 | 8/2014 | St. Clair |
| 2014/0222954 A1 | 8/2014 | Vaccari |
| 2014/0250126 A1 | 9/2014 | Baldwin |
| 2014/0250175 A1 | 9/2014 | Baldwin |
| 2014/0258850 A1* | 9/2014 | Carey ................... G06Q 50/01 715/243 |
| 2014/0279034 A1 | 9/2014 | Samuel |
| 2014/0297739 A1 | 10/2014 | Stein |
| 2014/0304178 A1 | 10/2014 | Bengson |
| 2014/0337007 A1 | 11/2014 | Waibel |
| 2014/0359464 A1 | 12/2014 | Possing |
| 2014/0365849 A1 | 12/2014 | Ishmael |
| 2014/0368601 A1 | 12/2014 | deCharms |
| 2014/0372525 A1 | 12/2014 | Raghavan |
| 2015/0005009 A1 | 1/2015 | Tomkins |
| 2015/0032510 A1 | 1/2015 | Farahat |
| 2015/0046841 A1 | 2/2015 | Sharon |
| 2015/0058324 A1 | 2/2015 | Kauwe |
| 2015/0081349 A1 | 3/2015 | Johndrow |
| 2015/0094097 A1 | 4/2015 | Fraccaroli |
| 2015/0105096 A1 | 4/2015 | Chowdhury |
| 2015/0106443 A1 | 4/2015 | Jensen |
| 2015/0106448 A1 | 4/2015 | Ownbey |
| 2015/0112749 A1 | 4/2015 | Erdal |
| 2015/0112753 A1 | 4/2015 | Suvarna |
| 2015/0112963 A1 | 4/2015 | Mojtahedi |
| 2015/0120406 A1 | 4/2015 | Ekberg |
| 2015/0127748 A1* | 5/2015 | Buryak ................... H04L 51/32 709/206 |
| 2015/0172327 A1 | 6/2015 | Wansley |
| 2015/0193543 A1 | 7/2015 | Poliakov |
| 2015/0215258 A1 | 7/2015 | Nowakowski |
| 2015/0248437 A1 | 9/2015 | Braginsky |
| 2015/0248651 A1 | 9/2015 | Akutagawa |
| 2015/0261844 A1 | 9/2015 | Ramalho |
| 2015/0278830 A1 | 10/2015 | Zamer |
| 2015/0327038 A1 | 11/2015 | Sooriyan |
| 2015/0347979 A1 | 12/2015 | Fasen |
| 2015/0356449 A1 | 12/2015 | Vainstein |
| 2016/0003637 A1 | 1/2016 | Andersen |
| 2016/0042324 A1 | 2/2016 | Johnson |
| 2016/0098687 A1 | 4/2016 | Lamons |
| 2016/0104159 A1 | 4/2016 | Butterfield |
| 2016/0147413 A1* | 5/2016 | Kao ........................ H04L 67/10 715/753 |
| 2016/0147756 A1* | 5/2016 | Dalili ..................... G06Q 50/10 707/727 |
| 2016/0147839 A1* | 5/2016 | Kao ..................... H04W 4/206 707/740 |
| 2016/0148126 A1 | 5/2016 | Paleja |
| 2016/0148127 A1 | 5/2016 | Harkey |
| 2016/0148299 A1 | 5/2016 | Caralis |
| 2016/0150032 A1* | 5/2016 | Kao ........................ G06Q 50/01 709/203 |
| 2016/0150048 A1* | 5/2016 | Kalis ................... H04L 67/2847 709/203 |
| 2016/0150372 A1 | 5/2016 | Harkey |
| 2017/0098195 A1 | 4/2017 | Douglas |
| 2017/0286556 A1 | 10/2017 | Chan |

OTHER PUBLICATIONS

Non-Final Office Action for U.S. Appl. No. 14/551,184, filed Feb. 10, 2017.
Final Office Action for U.S. Appl. No. 14/551,191, filed Jan. 31, 2017.
Non-Final Office Action for U.S. Appl. No. 14/551,202, filed Mar. 9, 2017.
Non-Final Office Action for U.S. Appl. No. 14/551,213, filed Mar. 23, 2017.
Non-Final Office Action for U.S. Appl. No. 14/551,184, filed Jan. 11, 2018.
Non-Final Office Action for U.S. Appl. No. 14/551,213, filed Jan. 11, 2018.
Final Office Action for U.S. Appl. No. 14/551,191, filed Jan. 22, 2018.
Final Office Action for U.S. Appl. No. 14/551,213, filed Aug. 9, 2018.
Non-Final Office Action for U.S. Appl. No. 14/551,191, filed Oct. 24, 2018.
Non-Final Office Action for U.S. Appl. No. 14/551,213, filed Jan. 9, 2019.

* cited by examiner

DYNAMIC STATUS INDICATOR

TECHNICAL FIELD

This disclosure generally relates to location-based services.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Users of a social network may generate social-network content. For example, users may describe actions, activities, relationships, likes or dislikes, and locations or places that the user is, was, or will be at. When a user generates content or indicates an intent to generate content, for example by accessing a graphical user interface of a composer, an indicator may be displayed to the user that indicates whether a suggestion for content is being determined, or whether such a suggestions exists. The suggestion may have a quality value associated with it that must exceed a quality threshold. Display of the indicator may be emphasized based on the quality of the suggestion. As an example embodiment, when a user opens a composer a suggestion for a place to check-in to may be determined, and an indicator may be presented indicating that the suggestion is being determined or exists. Interacting with the indicator may display the suggested check-in or automatically associated the suggested check-in with the content the user creates.

The embodiments disclosed above are only examples, and the scope of this disclosure is not limited to them. Particular embodiments may include all, some, or none of the components, elements, features, functions, operations, or steps of the embodiments disclosed above.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates an example method for suggesting one or more users for a user of a social network to associate with a check-in.

FIG. 4 illustrates an example method for suggesting one or more users for a user of a social network to associate with a check-in.

DESCRIPTION OF EXAMPLE EMBODIMENTS

Figure 1:
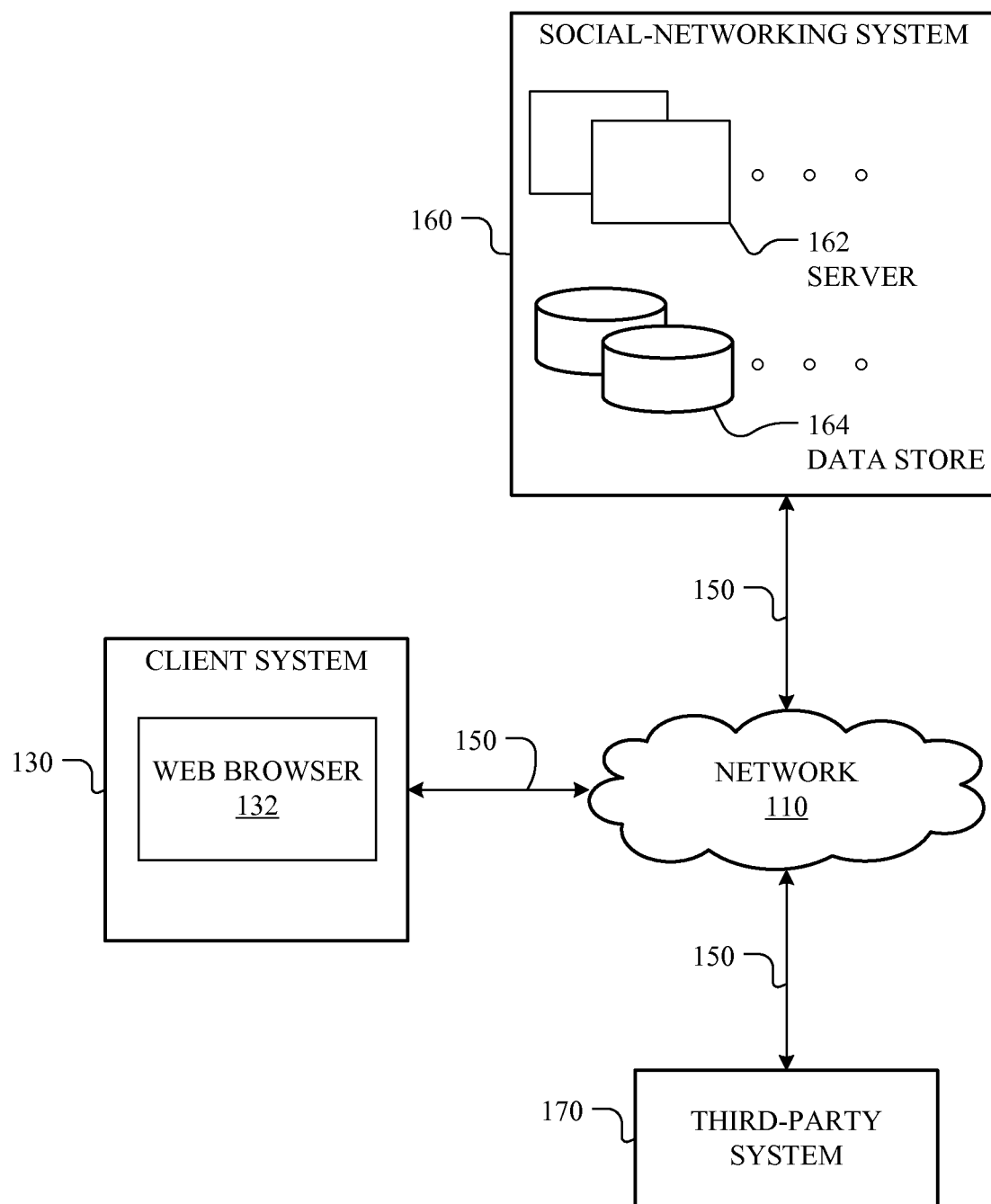
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
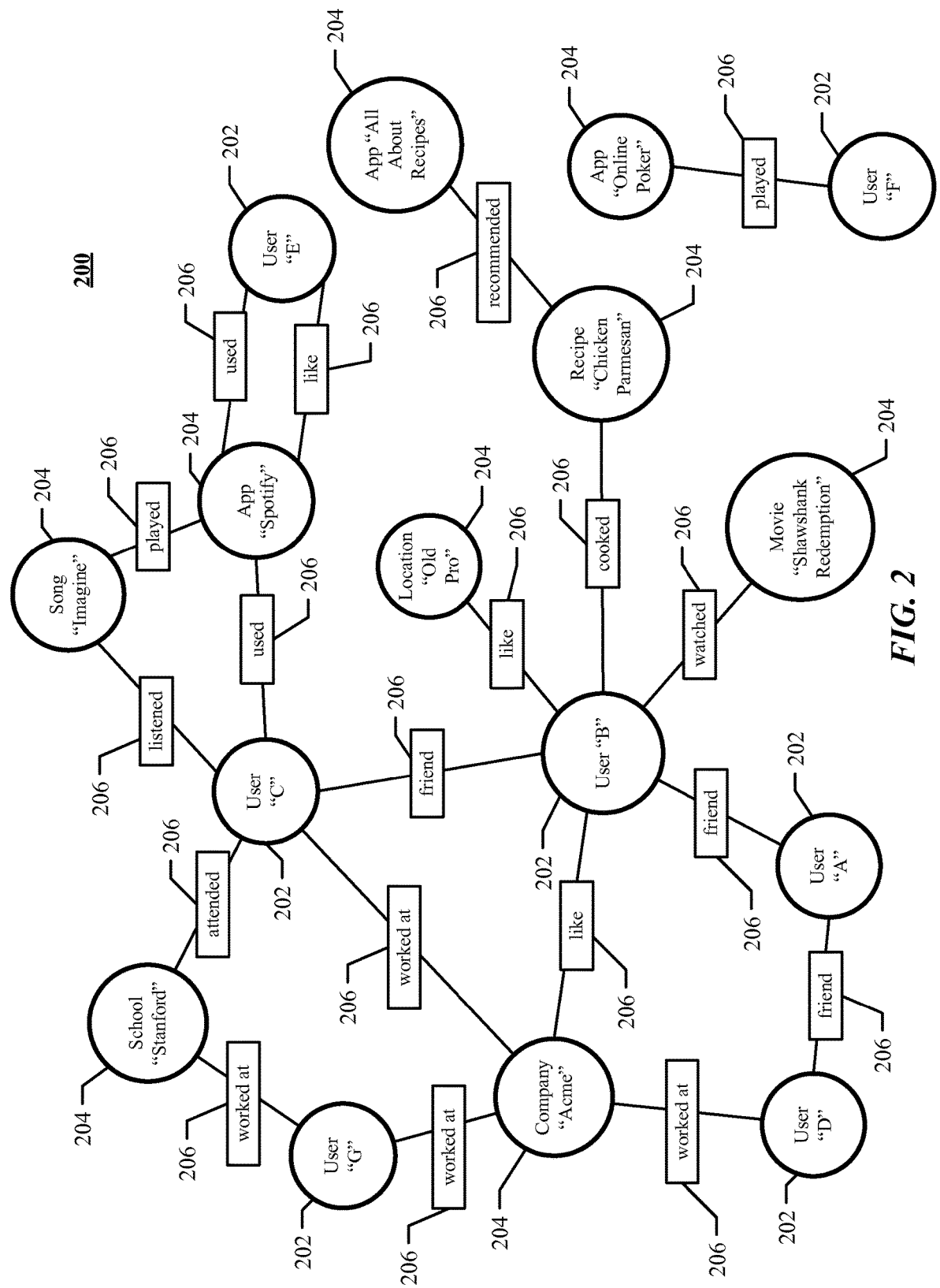
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check-in" icon (such as, for example, a clickable "check-in" icon) or a selectable "add to favorites" icon. Similarly, after a user clicks these icons, social-networking system 160 may create a "favorite" edge or a "check-in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. As another example, when a user checks in to place, an edge may be created between the node representing the place (or an event or structure at the place) and the node representing the user. The edge may include any suitable information, such as other users that are with the first user or a time stamp associated with the check-in. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an social-network content displayed to a user of a social network may be text (which may be HTML-linked), one or more images (which may be HTML-linked), one or more videos, audio, one or more ADOBE FLASH files, a suitable combination of these, or any other suitable content in any suitable digital format presented on one or more web pages, in one or more e-mails, or in connection with search results requested by a user. In addition or as an alternative, an social-network content may be one or more stories (e.g., a news-feed or ticker item on social-networking system 160). A story may be a social action by a user (such as "liking" a page, "liking" or commenting on a post on a page, RSVPing to an event associated with a page, voting on a question posted on a page, checking in to a place, using an application or playing a game, or "liking" or sharing a website). A story may be generated from stories in users' news feeds and displayed in specific areas within displays of users' web browsers when viewing a web page associated with social-networking system 160. A user may interact with social-network content in any suitable manner. The user may click or otherwise select the content Social-network content may include social-networking-system functionality that a user may interact with. For example, content may enable a user to "like" or otherwise endorse the content by selecting an icon or link associated with endorsement. Similarly, a user may share the content with another user (e.g., through social-networking system 160) or RSVP (e.g., through social-networking system 160) to an event associated with the content. In addition or as an alternative, content may include social-networking-system context directed to the user. For example, content may display information about a friend of the user within social-networking system 160 who has taken an action associated with the subject matter of the content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

A user may use a computing device to check-in to a place. As used herein, a "check-in" includes any suitable indication or identification that a user was, is, or will be at a place. A user may create a check-in by any suitable method. For example, when creating a check-in that is associated with a social network, a user may use a composer to generate content, including check-in content. A user may also edit, add to, or delete previously created check-ins. When creating a check-in, a user may associate the check-in with other content, or vice versa. For example, a user may describe an activity and associate a check-in with the described activity. For example, a user of a social network who is visiting the California Academy of Sciences may create a post such as "Science is awesome!" and associate that post with a check-in to the California Academy of Sciences. In particular embodiments, a user may associate one or more other users with the check-in, for example to indicate that the other users are, were, or will be at the checked-in place with the user. Check-ins may describe any suitable location and/or place information, such as the "California Academy of Sciences in San Francisco, Calif., U.S.A." As indicated by the previous example, check-in information may identify a specific building or set of buildings, area, city, county, state, country, neighborhood, business, or any other suitable place. Check-in information may be recorded and stored, creating check-in histories for one or more users. Check-in histories may include any suitable information, such as the check-in, a time stamp of when the check-in was created, a time stamp of when one or more users were at the place, other users who were with the user, any content associated with the check-in, or any other suitable information. Check-ins and check-in history may be displayed to any suitable user and according to privacy settings of the user to whom the check-in information belongs, identifies, and/or originated from. For example, in the context of a social network, check-in information (and, any suitable associated information) may be displayed as a story, as a push notification, in an email notification, in an SMS or MMS message, on a newsfeed or ticker, on a profile page, or in any other suitable manner in association with the social network. In particular embodiments, a user associated with a check-in may control information about that user's association. In particular embodiments, a user associated with a check-in may control any or all information about the check-in.

Check-ins and associated information may be displayed to any suitable users in any suitable manner. For example, a user of a social network may create check-in content on a social network. Other users of the social network may view the check-in and, possibly, any associated information, in particular embodiments according to the preferences of one or both users. Check-in information may also be displayed to a user based on the user's affinity for the check-in or information associated with the check. For example, the affinity may be calculated by one or more coefficients, as described more fully herein. As an example, check-ins generated by a user's first-degree connections or by users whom the user most frequently interacts with may have a higher affinity to the user than do other check-ins. As described more fully herein, check-ins may be presented on any suitable device using any suitable method of presentation.

Check-in information may be presented to one or more users. As an example, a user may query social-network content for check-in information from the user, from all other users, from particular users, or any suitable combination thereof. In particular embodiments, the query may filter non-check-in information, thus displaying only check-in information and/or associated content. In particular embodiments, a user may access historical check-ins. Historical check-in information may be presented to one or more users. The user may run queries on the check-ins, filter the check-ins, organize display of the check-ins according to various criteria, or any suitable combination thereof. For example, a user may run queries on check-ins to search for particular users, places, and/or types of places associated with the check-in. As another example, a user may run queries for particular content associated with check-ins or for check-ins at a particular time. The user may run queries for any suitable combination of criteria. Presentation of check-in information may be made according to any suitable predetermined and/or user-selected criteria. For example, check-in information may be organized by place (e.g. cities); chronology (e.g. reverse); popularity (e.g. most liked or checked-into places that one or more other users have visited), which may include the most popular places for a subset of users, such as the user's friends; type of place (e.g. restaurant, bar, museum, etc.); time of check-in; content associated with the check-in; or any suitable combination thereof. In particular embodiments, presentation may be organized by more than one criteria, for example by organizing types of places by chronology. User's may view, filter, comment on, or otherwise interact with their check-ins and other users' check-ins according to appropriate user preferences.

In particular embodiments, the social-networking system 160 may determine a geographic location (hereinafter also simply "location") of an object (e.g., a user, a concept, or a mobile-client system 130 associated with a user or concept). The location of an object may be identified and stored as a street address (e.g., "1601 Willow Road"), a set of geographic coordinates (latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept. In particular embodiment, the location of a mobile-client system 130 equipped with cellular, Wi-Fi, GPS, or other suitable capabilities may be identified with geographic-positioning signals. As an example and not by way of limitation, a mobile-client system 130 may include one or more sensors that may facilitate geo-location functionalities of the system. Processing of sensor inputs by the mobile-client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Example geographic-positioning signals include signals obtained by cell tower triangulation, Wi-Fi positioning, or GPS positioning. In particular embodiments, a geographic location of an Internet-connected computing device can be identified by the computer's IP address. A mobile-client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile-client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location. Although this disclosure describes determining the location of an object in a particular manner, this disclosure contemplates determining the location of an object in any suitable manner.

In particular embodiments, the social-networking system 160 may maintain a database of information relating to locations. The social-networking system 160 may also maintain meta information about particular locations, such as, for example, photos of the location, advertisements, user reviews, comments, check-in activity data, "like" activity data, hours of operation, or other suitable information related to the location. In particular embodiments, a location may correspond to a concept node 204 in a social graph 200 (such as, for example, as described previously or as described in U.S. patent application Ser. No. 12/763,171, which is incorporated by reference herein). The social-networking system 160 may allow users to access information regarding a location using a client application (e.g., a web browser or other suitable application) hosted by a mobile-client system 130. As an example and not by way of limitation, social-networking system 160 may serve webpages (or other structured documents) to users that request information about a location. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a mobile-client system 130 of the user (or a web- or network-based application using a browser client). The client application may automatically access GPS or other geo-location functions supported by the mobile-client system 130 and report the user's current location to the geo-social-networking system. In addition, the client application may support geo-social networking functionality that allows users to check-in at various locations and communicate this location to other users. A check-in to a given location may occur when a user is physically located at a location and, using a mobile-client system 130, access the geo-social-networking system to register the user's presence at the location. The social-networking system 160 may automatically check-in a user to a location based on the user's current location and past location data (such as, for example, as described in U.S. patent application Ser. No. 13/042,357, which is incorporated by reference herein). In particular embodiments, the social-networking system 160 may allow users to indicate other types of relationships with respect to particular locations, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location.

In particular embodiments, social-networking system 160 may be able to automatically and without any manual input from the user, track the location of mobile client system 130. Social-networking system 160 may poll or "ping" the mobile client system 130 at pre-determined intervals to obtain location information through an application of mobile client system 130 running in a background mode. In response to the ping, the application of mobile client system 130 may activate a location service of mobile client system 130. In particular embodiments, a process on mobile client system 130 may periodically send location updates to social-networking system 160. In particular embodiments, location updates may be provided by a mobile client system 130 through any suitable means such as cell tower triangulation, Wi-Fi based location services, or tracking Bluetooth MAC addresses. In particular embodiments, a place may determine the location of one or more users within the place based on any suitable method, and provide the location information to social-networking system 160. Social-networking system 160 may adjust the polling frequency or sampling duration based on various factors. Background location updates are further described in U.S. Patent Application Publication No. 2013/0331119, filed 6 Feb. 2013, and U.S. patent application Ser. No. 13/323,915, filed 3 Jul. 2014, which are incorporated by reference herein.

A user's location may be converted to one or more places by any suitable method, such as, for example and not by way of limitation, by accessing a data object mapping locations to places or by using user input to identify a place. As used herein, a "location" may refer to a description of a physical location, such as for example an identification of values of coordinates in a coordinate system, such as for example an identification of latitude, longitude, and/or altitude. As used herein, a "place" may refer to a description of an entity, structure, area or region, and/or events at a particular location. Examples of places include addresses, businesses (such as restaurants, etc.), landmarks, parks, concerts, sporting events, cities, states, or any other suitable place. A location or place may have a granularity associated with it, which may indicate the size of the location or place. For example, a business is more granular than a city, which is more granular than a state. A location or place may also include a confidence value associated with the location or place indicating a confidence that the identified location or place accurately represents the location or place intended to be identified, e.g., where the user and/or the user's client device actually are. Confidence values may be associated with various granularities. For example, a confidence that a user is at a particular business within a shopping center may be lower than a confidence that the user is at the shopping center.

When a user checks in to a place or initiates a process to check-in to a place, a user may be able to associate one or more other individuals with the check-in. The individuals may be users of a social network. In particular embodiments, the user may be prompted to associated individuals with the check-in. In particular embodiments, prompting the user may include suggesting one or more individuals for the user to associate with the check-in. This disclosure contemplates prompting the user to associate any suitable content with a check-in, not just other users. As used herein "a check-in process" may be any suitable process for creating a check-in, such as entering check-in information in a GUI such as a composer of social-network content, initiating a process that automatically creates a check-in, establishing periodic or otherwise automatic check-ins, or any other suitable process. When a process includes interacting with multiple elements or GUIs, or multiple steps taken by a computing device, this disclosure contemplates the check-in process as referencing one or more of those interactions or steps.

Figure 3:
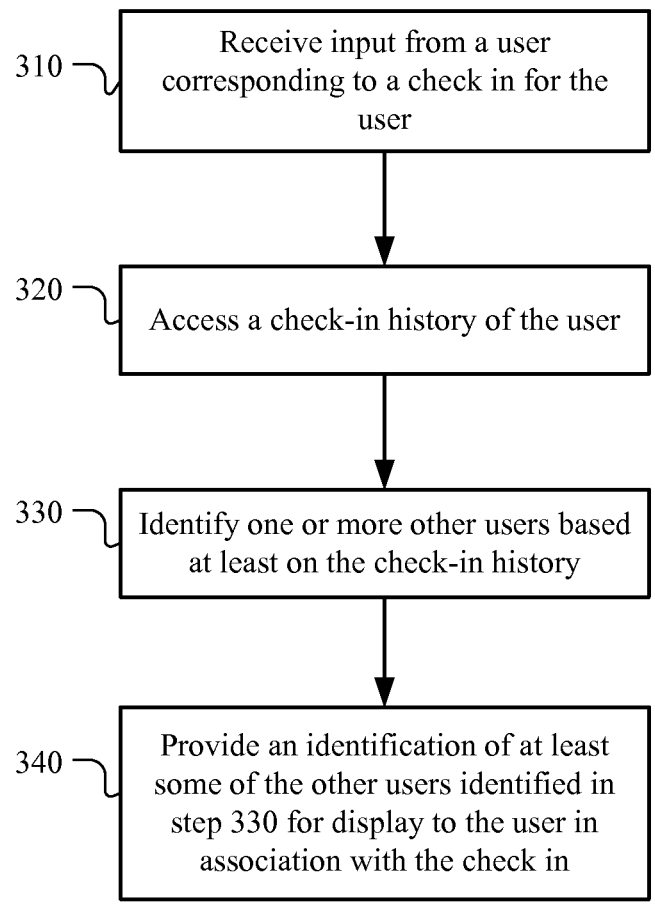

FIG. 3 illustrates an example method 300 for suggesting one or more users for a user of a social network to associate with a check-in. The method may begin a step 310, where input is received from a user corresponding to a check-in process. Such input may include initiating the check-in process, furthering the check-in process, or the like, for example by using a client computing device.

At step 320, a check-in history for the user may be accessed. The check-in history may be accessed from any suitable computing device, such as the computing device used by the user to create the check-in, or by a server computing device. The check-in history may contain any suitable information relevant to past check-ins and content associated with those check-ins. In particular embodiments, a check-in history may include an identification of one or more second users that the first user (i.e., the user creating the check-in) has previously associated with a previous check-in for the first user. In particular embodiments, a check-in history may include an identification of one or more second users that have previously checked in with the first user. For example, if a second user views a check-in by the first user and indicates that they were at the checked-in place with the first user, then such information may be stored in check-in history. As indicated by the previous embodiments, check-in history may include an identification of the user that associated another user (or himself) with a check-in. In particular embodiments, a check-in history may include an identification of one or more characteristics of one or more users that the first user has previously checked in with. Characteristics may be of any suitable type. For example, characteristics may include demographic information such as age, sex, location, residence, employment status, and so forth. Characteristics may include interest in similar events, persons, entities, or concepts. Such interest may be determined by, for example, an affinity for that event, person, entity, or concept. Characteristics may include membership or affiliation with one or more other users or entities, such as membership in a group. Characteristics may include shared traits, such as similar connections between users (and, in particular embodiments, degrees-of-separation between a user and those connections). Characteristics may include similar activity, such as similar activity on a social network (for example, posting content about events at the same concert, frequently posting about concerts at a particular park, etc.). In particular embodiments, characteristics may be determined by any suitable information associated with users' nodes or edges in a social network.

In particular embodiments, a check-in history may include an identification of a degree of separation between the node representing the first user and one or more nodes representing the one or more second users. For example, the check-in history may include an identification of whether a user associated with a previous check-in was a friend, a friend-of-a-friend, or something more removed. In particular embodiments, a check-in history may include an identification of one or more nodes in a social network that the first user and one or more second users are both connected to. In particular embodiments, a check-in history may include an identification of one or more places that the first user and one or more of the second users have previously checked into at or near the same time. For example, a first user may have checked into a sporting event, and a second user may have checked into the same sporting event. Thus, both users indicated that they were at the sporting event, even if they had not associated their presence with each other. A check-in history may include a frequency of such check-ins, for example, that a user checks in to most home games for the San Francisco Giants. In particular embodiments, a check-in history may include an identification of a type of one or more places that the first user and one or more of the second users have previously checked into at or near the same time. For example, a check-in history may identify that a first user and a second user tend to check-in to fast-food restaurants on Friday night. In particular embodiments, a check-in history may include an identification of one or more times identifying when the first user and one or more of the second users have checked in with each other. For example, a check-in history may indicate that a first user and a second user check-in together on Sunday afternoons. In particular embodiments, a check-in history may include a number of times that a user has checked in with another user. In particular embodiments, a check-in history may include an identification of a previous check-in identifying both the first user and at least one of the one or more second users. For example, a check-in history may identify that the first user and the second user were both associated with a check-in by a third user. While this disclosure describes specific examples of information that may be found in check-in history for a user, this disclosure contemplates that a check-in history may store or point to any suitable information related to a check-in or its associated content.

At step 330, one or more other users may be identified based on any suitable criteria, including information found in a check-in history of the user creating the check-in. Such criteria may include any of the information identified above that may be part of a check-in history, whether or not such information is stored in a check-in history or in some other data object. An example criterion for identifying one or more second users to suggest to a first user to associate with a check-in includes one or more second users that a user has previously checked in with. For example, a first user may be more likely to be with, or be willing to check-in with, other users that they first user has checked in with in the past. An identification may take into account a recency and/or frequency at which the first user has checked in with in the past. For example, if a user recently associated a second user as being at Times Square in New York City, and ten minutes later checks into a ramen restaurant near Times Square, then the second user may likely still be with the first user and may be identified. As another example, if a user associates a particular group of second users every Friday night with the user's check-in, then that group of second users may identified when the user creates a check-in on Friday night. In particular embodiments, criterion may include one or more second users that have previously checked in with the first user. In other words, second users who have previously associated themselves with a check-in for the first user may be identified, and possibly suggested, to a first user creating a check-in. As for the example above, recency and/or frequency may both be taken into account when identifying second users. In particular embodiments, whether the first user previously associated a second user with a previous check-in or the second user associated the second user with the previous check-in may be taken into account. For example, the first user may be more likely to check-in people that the first user has previously checked in, as those second users may be relatively more important or meaningful to the first user's check-ins when the user has previously taken time to check those users in. In particular embodiments, criterion may include characteristics of one or more users that the first user has previously checked in with. For example, second users may be identified based on an age of users that the first user has previously checked in with (whether the second users are associated with the check-in by the first user or by anyone else). As for any of the examples herein, this criterion may be combined with one or more other criterion to identify second users. For example, previous check-ins made by the first user or by second users may indicate that the first user has recently been touring with a large group and thus is likely to still be with that group. However, the user may be more likely to check-in with particular users in that group, such as users that share the same age, interests, etc. In particular embodiments, criterion may include an identification of a degree of separation between the node representing the first user and one or more nodes representing the one or more second users. For example, a first user may be more likely to check-in with second users that are more closely connected to the first user, such as the user's friends or friends-of-friends. In particular embodiments, criterion may include an identification of one or more nodes that the first user and one or more second users are connected to. For example, a first user and a second user may both have a "like" edge connecting their respective nodes to a node representing the Seattle Seahawks. The first user may be more likely to associate with a check-in at a Seahawks vs. Chargers game that second user than with another second user that the first user has the same relationship with but who is connected by a "like" edge to the San Francisco Forty-Niners. In particular embodiments, criterion may include a place that the first user and other second users have both independently previously checked in at. For example, if a first and second user have independently previously checked in to a neighborhood dive bar, then the second user may be suggested to the first user the next time the first user checks in to the dive bar. In particular embodiments, this criterion may include both place and time. For example, a first user and a second user who are friends may have independently checked in to a burrito place at lunch time on Wednesdays. When the first user checks in to the burrito place the following Wednesday, the second user may be suggested to the first user to associate with the check-in. As for any of the examples herein, any of a recency of check-ins, frequency of check-ins, relationships between users, shared interests between users, time of day, type of place, past check-in behavior, or any other suitable criterion may also be taken into account.

In particular embodiments, criterion may include a type of place that the first user and one or more of the second users have previously checked into, possibly at the same or similar times. For example, if the first user frequently checks into wineries and a second user does the same, the second user may be identified when the first user checks in to a winery. In particular embodiments, criterion may include an identification of one or more times identifying when the first user and one or more of the second users have checked in with each other. For example, if the first user and second user have checked into together around noon on Sundays (e.g. for brunch), then the second user may be identified when the first user checks in to a lunch place around noon on Sunday. In particular embodiments, criterion may include a recency between a check-in that associated both a first and second user, regardless of the creator or originator of the check-in or of who associated the first or second user with the check-in. For example, if both the first user and the second user were identified with a check-in in the past 15 minutes, then the second user may be identified when the first user creates a check-in. In particular embodiments, criterion may include past user behavior associated with check-ins. For example, second users that a first user consistently associates with a check-in or consistently declines to associate with check-ins may be identified. In the latter case, those second users may not be suggested to the first user. As another example, a first user who consistently declines to associate anyone with check-ins may receive fewer overall suggestions or less frequent suggestions than a user who more frequently associates other users with check-ins.

In particular embodiments, identifying one or more second users may include ranking those second users. For example, second users may be ranked on the likelihood that a first user will associate them with a check-in, on the likelihood that a second user will allow (or at least, not remove) such an association (if such functionality exists), and/or on the likelihood that the first and second users were, are, or will be at the same place. Those likelihoods may be based on any suitable factor, such as the factors discussed above for identifying a user. Thus, in particular embodiments, the second users most likely to be relevant to a first user's check-in may be more likely to be presented to a first user than are second users who are less relevant. In particular embodiments, identifying one or more second users may include identifying those second users whose likelihood of being associated with a check-in for a first user exceeds a predetermined threshold. In particular embodiments, identifying a user may take into account privacy considerations of the first or second users. As an example, second users that do not permit other users to associate them with a check-in may be identified as not to be presented to the first user as a suggestion to associate with a check-in. As another example, a user may be less likely to be associated with a check-in that may include sensitive information, such as a check-in to a bar or at a casino in Las Vegas. In particular embodiments, information indicating that the second user is associated with such check-ins may be presented only to certain users (e.g. non-co-workers) or may require consent from the second user before being presented to any or some other users.

At step 340, information identifying at least one of the other users may be provided for display to the user in association with the check-in (i.e., the first user). In particular embodiments, providing the information for display includes displaying the information to the user. Displaying the information in association with the check-in may include displaying the information during a check-in process, such as for example providing a list of the other users to the user creating the check-in. In particular embodiments, displaying the information in association with the check-in may include displaying the information after the check-in has been created. For example, a user may create and post a check-in to a social network, and one or more other users may subsequently be suggested to the user to associate with the check-in. In particular embodiments, displaying the information in association with the check-in may include displaying the identified users according to one or more filters or rankings. In particular embodiments, displaying the information in association with the check-in may include displaying an icon or other GUI element that indicates that one or more suggestions exist for the user to associate with the check-in. Interacting with the element may reveal at least some of the other users. In particular embodiments, the user can sort, filter, query, or perform any other suitable operation on the displayed information.

Once the information identifying the other users is displayed, the user may interact with the display, such as for example by selecting some of the information, to associate another user with the check-in. The check-in may then include information identifying the other user(s), for example indicating that the other users were at the place with the user creating the check-in.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for suggesting one or more users for a user of a social network to associate with a check-in including the particular steps of the method of FIG. 3, this disclosure contemplates any suitable method for suggesting one or more users for a user of a social network to associate with a check-in including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
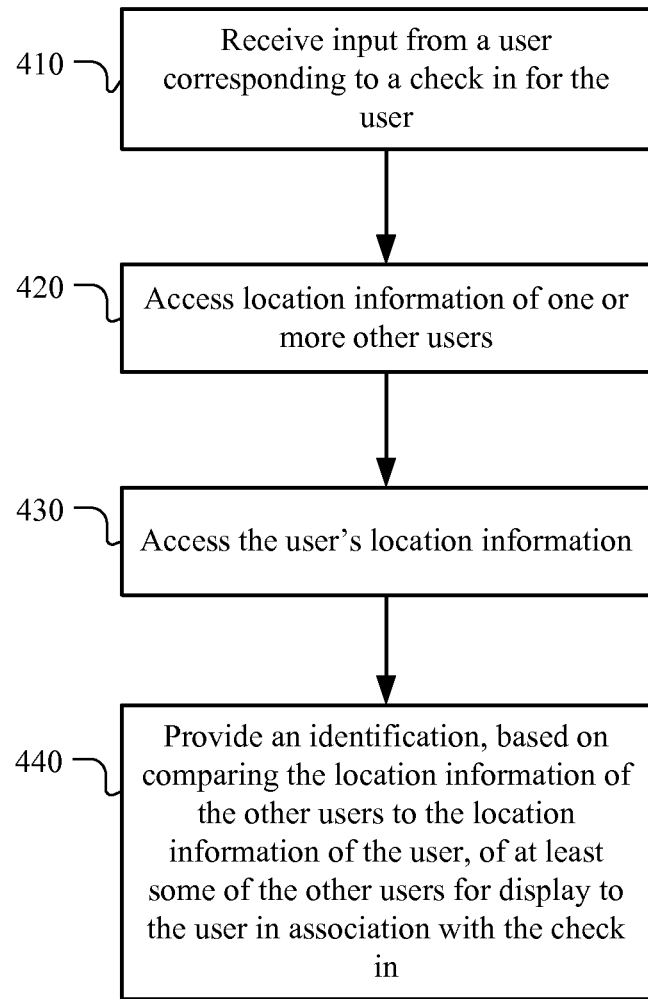

In particular embodiments, one or more second users may be suggested to a first user to associate with a check-in based at least in part on a distance between the users. In particular embodiments, distance may be a criterion that is taken into account along with any of the criterion discussed above for identifying a second user. FIG. 4 illustrates an example method 400 for suggesting one or more users for a user of a social network to associate with a check-in. FIG. 4 may begin with step 410, where input is received from a user corresponding to a check-in for the user. The description relating to step 310 applies to step 410, as well. At step 420, the location of one or more second users is accessed, and at step 430, the location of the first user is accessed. At step 440, one or more second users are identified based at least in part on a comparison between the location of the first user and the locations of each of the second users. The descriptions of accessing information and providing information for display or displaying information provided in relation to FIG. 3 apply to the method of FIG. 4, as well.

In particular embodiments, step 440 may include determining the distance between the first and second user. Distance may be determined by any suitable manner, such as by estimating the distance between the users or by calculating the distance according to known or estimated locations. Location may be determined by any suitable method, including by explicit and implicit methods discussed more fully herein. For example, one or both of the locations of the first and second user may be determined by explicit information input by those users. As another example, location information may be determined by implicit determinations of location (e.g. without user input). For example, user location may be determined by one or more background processes, such as a process that periodically invokes location determination by a user's mobile device without requiring manual input or intervention by the user. Such methods include those described more fully in U.S. Patent Application Publication No. 2013/0331119, filed 6 Feb. 2013, and U.S. patent application Ser. No. 13/323,915, filed 3 Jul. 2014, which are both incorporated herein by reference.

As described above, distance may be determined by estimating such distances. As an example, distance may be estimated based on social content or activities that indicate where a user was, is, or will be. For example, accepting an invite to an event indicates that a user intends to be at the event place at the time of the event. As another example, a post such as "Atmosphere at the San Jose Sharks game is awesome!" may indicate that a user is at the Sharks game. Past check-in history may also be used to infer distances. For example, a user who 30 minutes ago checked into a place 300 miles away from another user's check-in 30 is unlikely to be near the other user. As indicated by the previous example, distances may be estimated qualitatively (e.g., "far" or "near"), not just quantitatively.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for suggesting one or more users for a user of a social network to associate with a check-in including the particular steps of the method of FIG. 4, this disclosure contemplates any suitable method for suggesting one or more users for a user of a social network to associate with a check-in including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

As described above, a second user may be suggested to a first user to associate with a check-in based on various criteria, such as past check-in history and distances between the users. In particular embodiments, one or more criteria may be used to screen second users; i.e., if the second user does not meet the screening criteria, then the second user will not be suggested to the first user. In particular embodiments, criteria may be used to rank or select second users who are most likely to be relevant to the first user's check-in. This disclosure contemplates any suitable criteria or combinations of criteria used to rank, filter, screen, or otherwise suggest second users for the first user to associate with a check-in.

Figure 5:
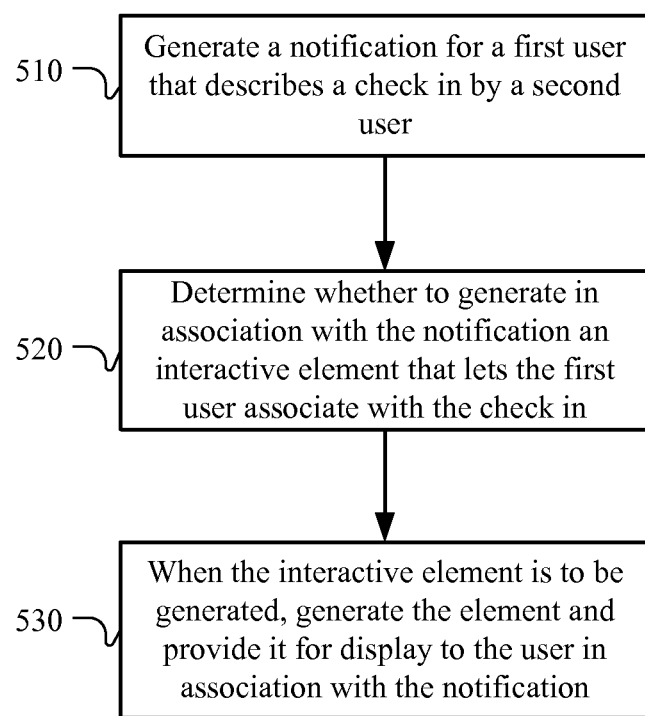
FIG. 5 illustrates an example method for providing a user the ability to associate himself with a check-in displayed to the user.

In particular embodiments, a first user may wish to associate themselves with a check-in that has been created by another user. For example, if the first user is viewing social-network content and sees that one of the user's friends checked in to a restaurant last night, the first user may wish to associate themselves with the check-in if they were also at the restaurant last night. Thus, a first user may be presented with functionality to associate himself with a check-in. FIG. 5 illustrates an example method 500 for providing a first user the ability to associate himself with a check-in displayed to the first user. At step 510, a notification is generated for the first user that describes a check-in by a second user. This disclosure contemplates any suitable notification, including notifications by email, SMS, MMS, text, push, on a newsfeed, ticker, or page of a social network, or any other suitable method. In particular embodiments, a notification may be generated for a first user based on the first user's affinity for the second user, for a place corresponding to the check-in, for content associated with the check-in, or any suitable combination thereof. In addition or the alternative, a notification may be generated for a first user based on the second user's affinity for the first user, based on a check-in history for the first user and/or the second user, or any suitable combination thereof At step 520, the method determines whether to generate an interactive element in association with the check-in that will allow the user to associate himself with the check-in. The interactive element may be of any suitable type, such as a button, slider, icon, link, etc., and may take any suitable visual form or representation. In particular embodiments, the interactive element is displayed as part of the check-in notification. In particular embodiments, the interactive element may be displayed apart from the notification, such as in a separate email or part of a separate notification. In particular embodiments, the interactive element may include functionality to associate the first user or decline associating the first user, i.e. to affirmatively indicate that the first user does or does not want to associate with the check-in.

In particular embodiments, the interactive element may be presented to a user with each check-in that is the user is notified about. In particular embodiments, the interactive element may be presented for only certain notifications. This disclosure contemplates any suitable method of determining whether to present the interactive element to a user in association with the notification. For example, any of the criterion for identifying a second user for a first user to associate with a check-in, as described more fully herein, may be used to determine whether to present a first user with an interactive element that allows them to associate with a check-in crated by another user. For example, the check-in history of the first user or of the second user, or both, may be used to determine whether to present the interactive element to the first user. As another example, the location of the first user relative to the place identified by a check-in—either a location at the time of the check-in or the user's current location—may be used to determine whether to generate the interactive element. A first user may be more likely to interact with, including to associate with a check-in, an interactive element corresponding to a check-in, place, content, or second user generating the check-in when any or all of those things are more relevant to the first user. Thus, any of the description herein of determining relevance, including affinity, may be used to determine whether an interactive element will be presented to the first user. In particular embodiments, users' preferences, including privacy settings, may determine whether to present a notification and/or an interactive element.

At step 530, when the interactive element is to be generated, then the interactive element is generated and provided for display to the first user in association with the notification. In particular embodiments, step 530 includes displaying the interactive element and the notification to the first user. Any suitable disclosure herein for providing content for display to a user may be utilized in step 530, where appropriate.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing a first user the ability to associate himself with a check-in displayed to the first user including the particular steps of the method of FIG. 5, this disclosure contemplates any suitable method for providing a first user the ability to associate himself with a check-in displayed to the first user including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments, when the first user interacts with the interactive element to associate the first user with the notification, then the first user may be associated with notification. For example, a server, such as a server of a social network, may receive information identifying the interaction and may associate the user with the check-in (e.g., by adding an edge between the first user and the check-in and/or the place represented by the check-in). In particular embodiments, when a first user interacts with the interactive element to associate the first user with the notification, the second user may be sent a notification of the interaction. In particular embodiments, the second user may be presented with an interactive element to allow or disallow the first user from associating with the second user's check-in. In particular embodiments, the second user may be presented with the notification before the first user is associated with the notification. In particular embodiments, the second user may be presented with the notification after the user is associated, but may then confirm or undo that association. In particular embodiments, the second user may control which other users may see the association. In particular embodiments, another user associated with the check-in may control who can associate with the check-in and/or who can see the association, at least with that other user.

In particular embodiments, when the second user can allow or deny the association, the association may be evaluated according to one or more criteria before requiring input from the second user. In particular embodiments, the criteria could be established at least in part by user preferences. In particular embodiments, the criteria may be automatically established, e.g. by a set of rules implemented by a social network. For example, the second user could identify places, times, other users, types of places, or any suitable information or combination of information that automatically allows or disallows association with a check-in. Such criteria could be any suitable criteria, including the criterion identified above for identifying a second user to associate with a check-in for a first user, described more fully herein. In particular embodiments, a criterion may be a maximum degrees-of-separation, such as two, between the first user and the second user in the social graph. In particular embodiments, the criterion may include a minimum degrees of separation, below which a first user must is automatically associated without requiring any further input from the second user. In particular embodiments, criterion may include or be based on a check-in history for one or more users. In particular embodiments, the criterion may be negative criteria, i.e. criteria the disallows association with check-ins. In particular embodiments, the criteria may be positive criteria, i.e. criteria that allows association. In particular embodiments, the criteria may be criteria that establishes the need for second-user input. In particular embodiments, a second user may review any or all associations and manual allow or deny such associations. In particular embodiments, every association may be presented to a second user for approval. In particular embodiments, the second user can vary any of the criteria and its outcome (e.g. automatically allowing or disallowing the association, or forwarding to the second user).

As discussed more fully herein, a user may generate content for a social network. In particular embodiments, a user may be provided with suggested content to create or associate with a social network. Such content may be any suitable content, such as for example a post, check-in, connection (such as creation of an edge), comment, or any other suitable content. In particular embodiments, an indicator may be presented to a user to indicate that a suggestion exists or that suggested content is being determined. In particular embodiments, the indicator may indicate a quality of a suggestion, i.e. that a high-quality suggestion exists or is being determined.

Figure 6:
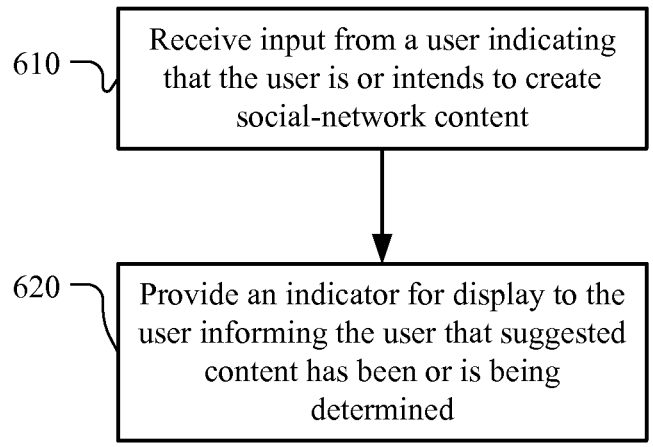
FIG. 6 illustrates an example method for providing a user with a graphical indicator indicating that a high-quality suggestion for content for the user to generate in connection with a social network is being or has been determined.

FIG. 6 illustrates an example method 600 for providing a user with a graphical indicator indicating that a high-quality suggestion for content for the user to generate in connection with a social network is being or has been determined. At step 610, input may be received from a user indicating that the user intends to create social-network content. In particular embodiments, such input may be a user opening a composer, opening a social-network application or webpage, creating content, posting content, or any other suitable input.

At step 620, an indicator is provided for display to a user indicating that suggested content has been or is being determined. In particular embodiments, the indicator may also indicate that the quality of the suggestion has or will exceed a quality threshold. The threshold may be established by any suitable method, such as evaluating the user's affinity for the content, other users' (such as friends) affinity for the content, a likelihood of the user adopting the suggestion, or any other suitable combination thereof. In particular embodiments, if one or more suggestions are available, the suggestions may be ranked prior to presentation to the user. The suggestions may be presented as ranked, or only the top-ranked suggestion may be presented. If the user declines a top-ranked suggestion then the next-ranked suggestion may be presented, and so on.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for providing a user with a graphical indicator indicating that a high-quality suggestion for content for the user to generate in connection with a social network is being or has been determined including the particular steps of the method of FIG. 6, this disclosure contemplates any suitable method for providing a user with a graphical indicator indicating that a high-quality suggestion for content for the user to generate in connection with a social network is being or has been determined including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 11:
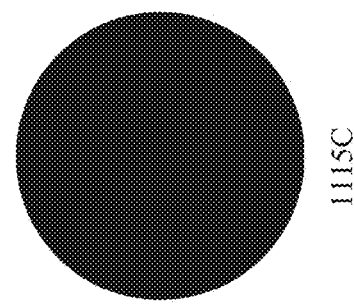
FIG. 11 illustrates example embodiments of the graphical indicator described herein.
Figure 11:
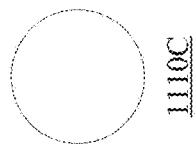
Figure 11:
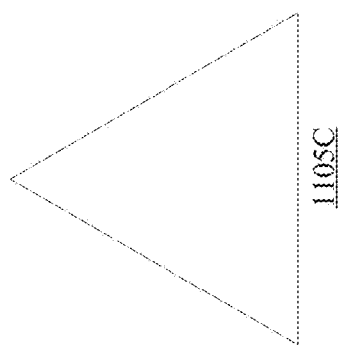
Figure 11:
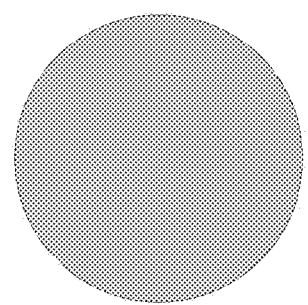
Figure 11:
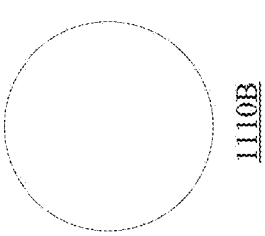
Figure 11:
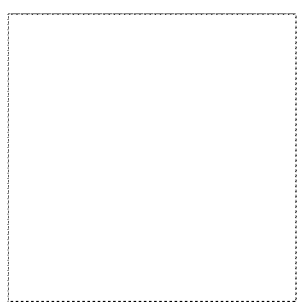
Figure 11:
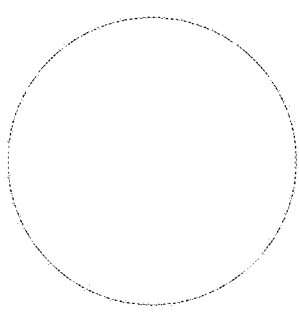
Figure 11:
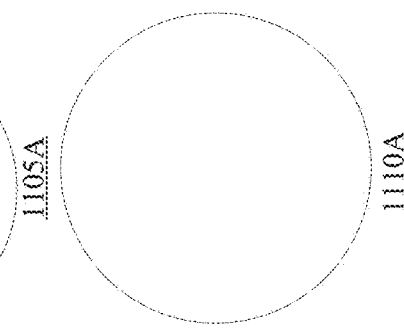
Figure 11:
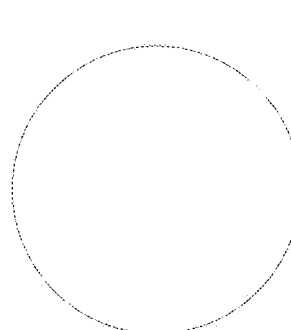

In particular embodiments, the appearance of an indicator may depend on particular aspects of the suggestion. For example, the indicator may take one appearance when a suggestion is being determined and a second appearance when whether such a suggestion exists is being determined. The indicator may take a third appearance when the suggestion exists and when the quality of the suggestion (i.e., the suggested content) exceeds a particular threshold. For example, the third appearance may indicate that the user is relatively likely to adopt the suggestion, or that other users are likely to interact with the content if the user posts that content. The different appearances may include different or various amounts of graphical emphasis or embellishment. For example, the indicator may be emphasized when suggested content is determined relative to when whether suggested content exists is being determined. The indicator may be even more emphasized when a relatively high quality suggestion has been determined. Emphasis may include any suitable emphasis, such as audio, graphical, tactile, or the like. Graphical emphasis may take any suitable form, such as a size of the indicator, a color of the indicator, a brightness of the indicator, an animation of the indicator, a shape of the indicator, a placement of the indicator on a GUI, or any other suitable graphical emphasis. Emphasis, including graphical emphasis, may be also or in the alternative be used to indicate the relative quality of a suggestion. In other words, a relatively higher quality suggestions may be more emphasized than a relatively lower-quality suggestion. FIG. 11 illustrates example embodiments of the indicators described herein. For example, elements 1105A-C of FIG. 11 illustrate example indicators corresponding to each of the three appearances. In particular embodiments, the first appearance may correspond to appearances 1105A, 1110A, or 1115A; the second appearance may correspond to appearances 1105B, 1110B, or 1115B, and the third appearance may correspond to appearances 1105C, 1110C, or 1115C. However, this disclosure contemplates other correspondences between the appearances and 1105A-C, 1110A-C, and 1115A-C. As illustrated by appearances 1105A-C, the shape of the indicator indicates whether suggested content is being determined, has been determined, or has been determined not to exist. As illustrated by appearances 1110A-C, the relative size of the indicator indicates whether suggested content is being determined, has been determined, or has been determined not to exist. As illustrated by appearances 1115A-C, the color of the indicator indicates whether suggested content is being determined, has been determined, or has been determined not to exist. While appearances 1115A-C are shown in greyscale, this disclosure contemplates that any suitable colors may be used for appearances 1115A-C. While FIG. 11 illustrates particular shapes, relative sizes, or colors of particular appearances of an example indicator, as described above this disclosure contemplates any suitable size, color, brightness, animation, shape, placement on a GUI, or any other suitable graphical emphasis for the indicator, or any suitable combination thereof.

Suggested content may be of any suitable type. For example, suggested content may be content describing an activity such as an event the user is attending, a sport the user is playing, or anything that the user may be doing, was doing, or about to do or interact with. In particular embodiments, suggested content may include an identification of electronic content that the user is interacting with, such as audio that a user is listening to, video that the user is watching, images that the user is viewing, an application that the user is interacting with, or so on. Detecting such activity and interactions may be performed in any suitable manner, including those described in U.S. Pat. No. 8,706,499 and U.S. Patent Application Publication No. 2014/0067945, both of which are incorporated herein by reference.

In particular embodiments, suggested content may include suggested information relating to a check-in. In particular embodiments, such content may be a suggestion for a check-in itself, or may be suggestion for information or content to associate with a check-in, such as one or more other users, as described more fully herein. In particular embodiments, determining the quality of content for a suggested check-in or content to associate with a check-in may be based on criteria, such as for example a check-in history for the user, a place associated with the check-in, a confidence that the suggested location or place is the actual location or place that the user is at, a type of place associated with a check-in, a time of day associated with the check-in, or any other suitable criteria. This disclosure contemplates that any of the criteria used to identify one or more second users to a first user may be used to determine a quality for a suggestion or suggested content related to a check-in for a user.

In particular embodiments, a user may be automatically associated with a check-in. For example, a user may be automatically associated with an existing check-in. For example, regarding the method of FIG. 5, a first user may be automatically associated with another user's existing check-in—based on criteria such as the relevance of the check-in to the first user—and may be presented with an interactive element to confirm the association or to de-associate with the check-in. In particular embodiments, a user may be automatically associated with a check-in when creating social-network content.

Figure 7:
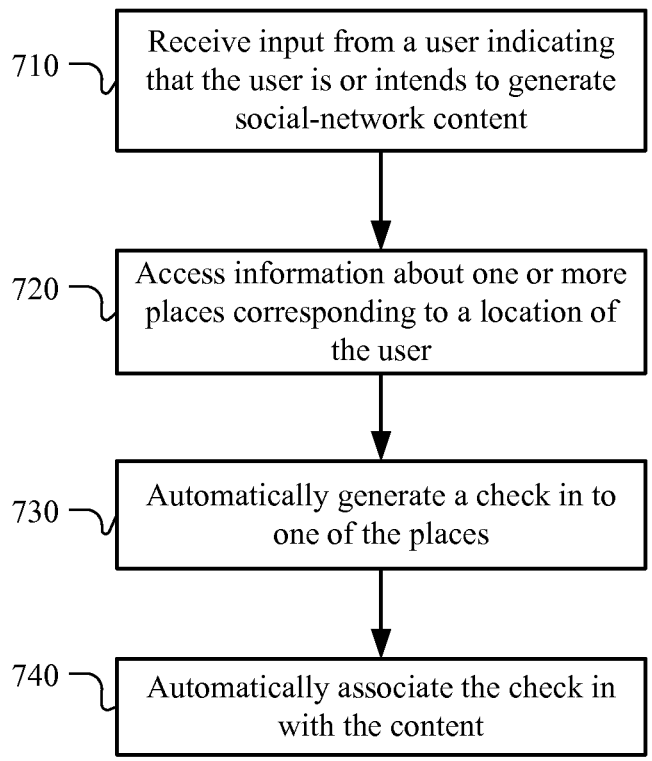
FIG. 7 illustrates an example method for automatically generating a check-in for a user of a social network.

FIG. 7 illustrates an example method 700 for automatically generating a check-in for a user of a social network. At step 710, input is received from a user of the social network indicating that the user is or intends to create content. As described more fully herein, such input may include a user opening a composer, creating content, accessing a social network, or any other suitable input. At Step 720, information about one or more places corresponding to the user's location is accessed. In particular embodiments, step 720 may include an explicit determination of a place or location made by a user. This disclosure contemplates any suitable method for determining location or places, as described more fully herein. At step 730, a check-in to the place, or to the place corresponding to the location, is automatically generated. At step 740 the check-in is associated with the content. For example, if the user is generating content, then the check-in may be associated with the content. In particular embodiments, a user may be notified that check-in has been automatically created, for example by an indicator such as the indicator of FIG. 6. If the user indicates an intent to generate content, then the check-in may be stored and then associated with the content that the user ultimately generates. In particular embodiments, whether to associate a check-in with content may depend on the content that is generated. In particular embodiments, whether to associated a check-in with content may depend on a check-in history for the user, a place the user is at, a time of day, a type of place, or any other suitable information. For example, any of the information described in connection with identifying a second user for a first user to associate with a check-in may be used determine whether to automatically generate a check-in, whether to associate a check-in with particular content, or both.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for automatically generating a check-in for a user of a social network including the particular steps of the method of FIG. 7, this disclosure contemplates any suitable method for automatically generating a check-in for a user of a social network including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, an interactive element may be presented to the user to edit the check-in, such as removing the check-in, adding information to the check-in, etc. In particular embodiments, the method of FIG. 7 may be performed periodically, e.g. each time content is generated, or potentially apart from content generation, such as on a fixed schedule or as a result of a triggering event. For example, steps 720-740 may be performed each time a change in the user's location or place is detected, using any of the methods for detecting a location or place as described herein. A check-in may then be automatically generated for that place. In particular embodiments, a check-in history may be automatically created using at least the automatic check-ins. In particular embodiments, the user's check-ins may be displayed, for example as a map showing the places a user went, a time the user was at those places, and/or routes the user took. For example, a user vacationing in Paris could show other users where the user went and how the user got there. The user's privacy preferences and settings may govern which users can see which check-ins, whether check-ins can be automatically created, and/or whether check-ins can be automatically associated with any or certain content.

In particular embodiments, step 730 may determine a place based a on confidence associated with a geographic granularity of the place, i.e. how precise the identification of the place is. For example, based on the user's location it may be fairly certain that the user is at a specific shopping center but less certain that the user is at a specific restaurant within that shopping center. In particular embodiments, a confidence value associated with the granularity may be used to determine whether to use the place associated with that granularity. The confidence value may be determined by any suitable method, and may depend on the method used to locate the user, the method used to determine the place, the time since last location, the user's motion at given time or over a particular time period, or any other suitable method. An automatic check-in may be associated with the place that has the highest confidence value. In particular embodiments, the check-in may be associated with the most precise granularity that has a confidence value higher than a threshold. In particular embodiments, more than one place may be associated with a check-in. For example, a check-in may indicate that a user is at "Joya" in Palo Alto, Calif. Thus, three levels of granularity (business, city, state) may be determined and presented in a single, automatic check-in. While this disclosure discusses particular aspects of granularity in connection with FIG. 7, this disclosure applies to check-ins generally, where appropriate.

Figure 8:
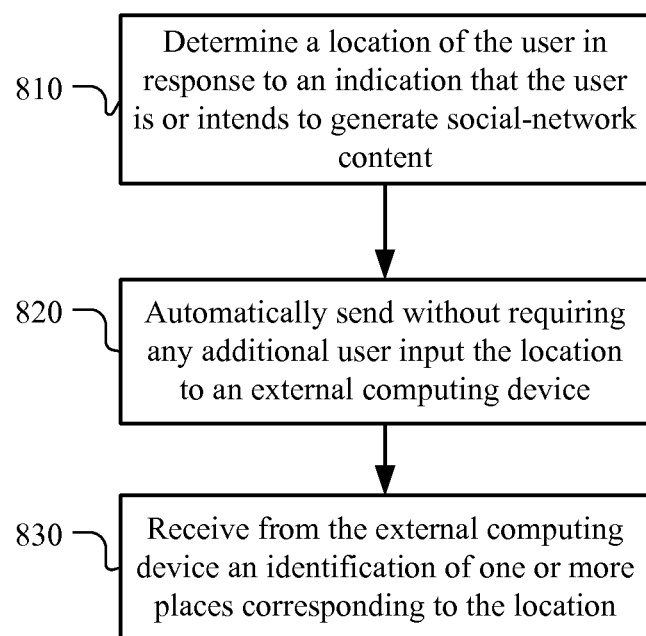
FIG. 8 illustrates an example method for prefetching location and place data for a user of client device.

Determining the location of a user and converting location into places can be a computationally intensive process. When generating check-ins or suggesting places to a user, such as when the user is generating content, determining a place the user is at may take longer than it takes the user to generate content, forcing the user to wait or rendering the functionality associated with those determinations unavailable to a user who chooses not to wait. FIG. 8 illustrates an example method 800 for prefetching location and place data for a user of client device. In step 810, the user's computing device determines the location of the user in response to an indication that the user is or intends to create content on a social network. While the location update of step 810 is based on the user creating or intending to create content, this disclosure contemplates that the location of the user may be determined based on any suitable event, such as a periodic location update or a user-requested location update. This disclosure contemplates any suitable method for determining the location of a user, and contemplates any suitable indication that the user is or intends to create content. In particular embodiments, determining the location of a user involves accessing a previously determined location of the user, such as a most recently determined location. In particular embodiments, the determined location may be the location of the user at or near the time relevant to the content being generated. For example, for content referencing a sporting event from the day before, the determined location may be the location of the user at the time of the sporting event the day before.

At step 820, the client computing device automatically sends the location to another computing device, without requiring any further user input. For example, the user does not need to approve or request that the location information be sent. The external computing device is any suitable computing device, such as for example a server computing device of a social network. The server computing device stores, or has access to, a data object mapping places to particular locations.

At step 830, the user's client computing device receives from the external computing device an identification of one or more places that correspond to the user's location. This disclosure contemplates any suitable method for determining which places correspond to a user's location. For example, the client computing device may receive all places within a certain radius, or distance based on any other shape, of the location of the client computing device. As another example, the client computing device may receive only top-ranked places. As another example, the client computing device may receive places based on any suitable criteria, such as check-in history, the location of connections, the degree-of-separation to those connections, a type of place, the user's propensity to check-in to a place or type of place, the number of times a user has checked into a place or type of place, any of the criteria for identifying a second user for a first user to associate with a check-in, or any suitable combination thereof.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for prefetching location and place data for a user of client device including the particular steps of the method of FIG. 8, this disclosure contemplates any suitable method for prefetching location and place data for a user of client device including any suitable steps, which may include all, some, or none of the steps of the method of FIG. 8, where appropriate.

Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Once the places are received, the client computing device may display one or more of the places to the user in connection with location-based services, such as generating check-ins. For example, the place may be presented when suggesting a check-in to a user, used when automatically generating check-in, or any other suitable location-based service, including but not limited to those described more fully herein. By executing the process for receiving place information before the user explicitly requests such information or initiates an operation that requires such information, the example method of FIG. 8 may reduce wait times for place information. In particular embodiments, the places may be displayed to a user when the user requests a lists of places, such as to associate with a check-in, or uses a mapping application. In particular embodiments, the places may be ranked, for example by the client computing device or by the external computing device. Ranking may be based on any suitable criteria, such as for example, the user's check-in history, the location of connections in a social network, the degree-of-separation to those connections, a type of place, the user's propensity to check-in to a place or type of place, the number of times a user has checked into a place or type of place, a time of day, any of the criteria for identifying a second user for a first user to associate with a check-in, or any suitable combination thereof. Places that are more relevant to the user and/or to the content the user is generating may be ranked relatively higher, such for example by using the user's affinity for one or more places or users corresponding to those places. In addition or the alternative, relevance may be determined by a likelihood that user will check-into a particular place, perhaps at that particular time. For example, a user may be unlikely to be at a bar early on a Wednesday morning while on a business trip, and thus a bar near the location of the user may be lower ranked. AS another example, a user may be more likely to be at a place when other users that the user recently checked in with have checked into that place. The likelihood of a user being at a place may be based on the user's past check-in history, check-in history for many users (such as the user's connections), check-in history for all users, or check-in history for users having one or more similar characteristics as the user, such as the user's age, sex, job, etc. In particular embodiments, ranking may be based on the velocity of the user, i.e. the speed and direction of travel of the user. In other words, a user moving in a car at 60 mile per hour is unlikely to check-in to a place at the location the user is currently at. In this example, the places received in step 830 may be places corresponding to the location of the user and the velocity of the user, i.e. to places that the user likely is now at (if the motion was at some previous time) or will be at taking into account the user's location and direction of travel. As described above, places the user may likely be at may be estimated based on any suitable metric, such as the user's past check-in history or other users' check-in histories.

In particular embodiments, location-based services, such as check-in-related services, may require access to a network to download or access information for those services. For example, recommending a place to a user may require access to a network to locate the user, determine a place from a location, access mapping information to display to the user, or the like. In particular embodiments, a user of a client device may wish to use location-based services, such as check-in-related services, when the user's client device has a weak, poor, or otherwise nonexistent connection to a network. As used herein, a client device is "offline" with respect to a network when its connection to that network is too poor to download or access information necessary for location-based services from that network. The connection may be too poor when the connection is nonexistent, weak, unstable, periodically unavailable, or the like. The client device may be offline when the network connection is too poor to download or access necessary information in a useful or usable amount of time, i.e. if the latency of the connection is significantly higher than normal. This disclosure contemplates any suitable network, such as a Wi-Fi network, a cellular network, or any other suitable network. This disclosure contemplates any suitable connection to those networks.

Figure 9:
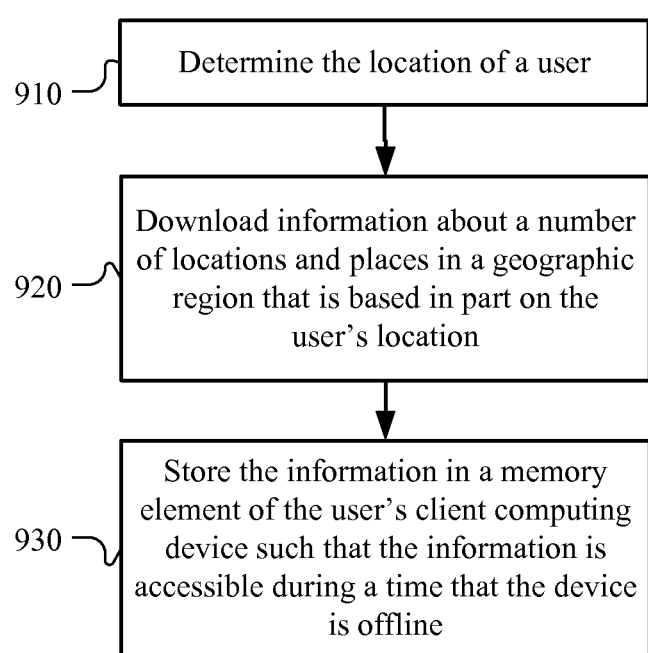
FIG. 9 illustrates an example method for providing offline access to location and place data to a user of a client.

FIG. 9 illustrates an example method 900 for providing offline access to location and place data to a user of a client device. At step 910, the location of the user of a client device is determined. This disclosure contemplates that the location may be determined by any suitable method, including by estimating the location or by explicit user input.

At step 920, the client device downloads information about one or more locations and/or places in a geographic region that is based on the user's location. The places to download and the size or extent of the geographic region may be determined based on any suitable criteria. In particular embodiments, the geographic region may be determined based on a velocity with which the user (i.e., the client device) is moving. For example, the geographic region may include more places or locations in the direction of the user's travel than a geographic region would for a user who is stationary. As another example, the shape of the geographic region may change, for example by extending a boundary of the region in the direction of the user's travel. The extension may be based on the user's speed. As another example, the region may have a center point, and the center point may be determined based on the user's direction of travel, speed, or both, for example by translating the center of the geographic region from the user's current location to a location in the direction of the user's travel. In particular embodiments, the geographic region may be based on a size of the information downloaded. For example, in a region that has many places per unit area, such as New York City, the geographic region may be smaller in physical area than a region that has fewer places per unit of area, even though identifying those places may take the same amount of physical storage on a computer device. As another example, the amount of information downloaded may not exceed a threshold amount. The threshold amount may be set by a user, based on the amount of storage in the client device, or a combination thereof. In particular embodiments, the geographic region may be based on a distance between the user's location and a perimeter of the geographic region. For example, if the geographic region is roughly circular, then the geographic region may be determined by identifying all the locations and/or places in region roughly defined by a particular radius. This disclosure contemplates a geographic region having any suitable shape defined by any suitable perimeter (or area, if the region is three-dimensional). In particular embodiments, the geographic region may be based on geographic boundary, such as the boundary of a neighborhood, district, city, shopping area, landmark, general area (such as Times Square in New York City or Union Square in San Francisco), tourist attraction, park, river, street, or any other suitable geographic boundary, or any suitable combination thereof. In particular embodiments, the geographic region may be based on a popularity of one or more places in the region. For example, the region may include places that are relatively popular or areas that include places that are relatively popular. Popularity may be determined by any suitable method, such as by the popularity of a place as indicated by the number of "likes" or connections to a node representing the place in a social graph. In particular embodiments, the geographic region may be based on a time of day. For example, during the evening the region may include more restaurants, theaters, and nightspots, while in the daytime the region may include more service-oriented businesses. In particular embodiments, the geographic region may be based on a check-in history for a user. For example, the region may be based on a check-in history of the user of the client computing device. Such history could include previous places the user has checked into, types of places the user has checked into, the connections the user has previously checked in with, or any other information or combination of information in the user's check-in history. The information that may be in a user's check-in history is described more fully herein, and includes, when suitable, any of information used to identify one or more second users to a first user to associated with a check-in. In particular embodiments, the geographic region may be based on the check-in history of one or more other users. For example, the popularity of one or more places may be based on the check-in history of other users who are within a maximum degree-of-separation from the user in a social graph.

While this disclosure describes specific examples of criteria for determining the geographic region, this disclosure contemplates any suitable criteria, including any of the criteria used to determine whether to suggest one or more second user to a first user to associate with a check-in. Moreover, this disclosure contemplates any suitable criteria, including that criteria, for downloading specific places in a particular geographic region. For example, some places in a geographic region may be included and others may not. For example, the most popular places, or the places the user of the client device is most likely to have an affinity for (perhaps at a particular time of day, such as a restaurant around dinner time) in a particular region may be downloaded. As another example, any of the information described more fully herein relating to determining whether to automatically check a user in to a place may be used to determine which places in a geographic region should be downloaded.

Step 920 may be performed at any suitable time. For example, step 920 may be performed periodically, when a change in the user's location is detected, on user demand, when the user's location appreciably changes (for example, when the user arrives in a different city or neighborhood), etc. In particular embodiments, the information may be downloaded based a strength of a network connection. For example, the information may be downloaded when a network connection exceeds a certain signal strength, indicating a strong or reliable network connection. As another example, the information may be downloaded when the strength of a network connection falls below a particular threshold, for example indicating that a connection may soon be lost. In particular embodiments, the information may be downloaded based on a history of a strength of a network connection. For example, if the strength gets or has gotten progressively weaker over a period of time, then the information may be downloaded. In particular embodiments, information may be downloaded based on a prediction of a future strength of a network connection. As an example, future network strength may be predicted based on user input, such as an explicit statement of future network strength at a particular time or based on content indicating future network strength, For example, a user may generate content for a social network indicating that the user is about to take a commercial flight, thus indicating that the user's device may soon be in "airplane mode," causing the information to be downloaded. In that example, the information downloaded may be the information associated with the location of the user's destination. As another example, the future strength of a network connection at a particular place, such as a basement bar, may be known or estimated based on past connections at the place or at similar places. As another example, future network strength may be based on current or previous network strength. For example, if network strength is periodically poor, future network strength may be predicted to be the same, and the information may be downloaded—possibly in portions—as a suitable network connection comes available.

At step 930, the information is stored in a non-transitory memory element of the client computing device so that the information can be accessed by the client device when the client device is offline with respect to a network connection. Such memory elements may include a non-volatile memory element, such as a hard drive.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for providing offline access to location and place data to a user of a client including the particular steps of the method of FIG. 9, this disclosure contemplates any suitable method for providing offline access to location and place data to a user of a client including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9

In particular embodiments, all or some of the information may be used for location-based services and/or presented to a user. For example, when a user attempts to create a check-in, the client device may determine whether it is offline. If it is, the client device may access the information to determine place information for the check-in. In particular embodiments, the client device may access the information even when the client device is online, or may determine whether to access the information based on the strength of a network connection. In particular embodiments, the user may query the information, such as for example to look up information about places or locations, such as while using a navigation application. This disclosure contemplates using the information or any portion thereof for any suitable location-based service, including the check-in-related functionality described more fully herein.

This disclosure describes several examples of location-based services, including services related to generating check-ins, related to content related to check-ins, or used in connection with check-ins. This disclosure contemplates that any description of relevance of content to a user, or of signals used to determine, rank, evaluate, or generate aspects of location-based services (including check-ins) applies to each location-based service described herein, where appropriate.

Figure 10:
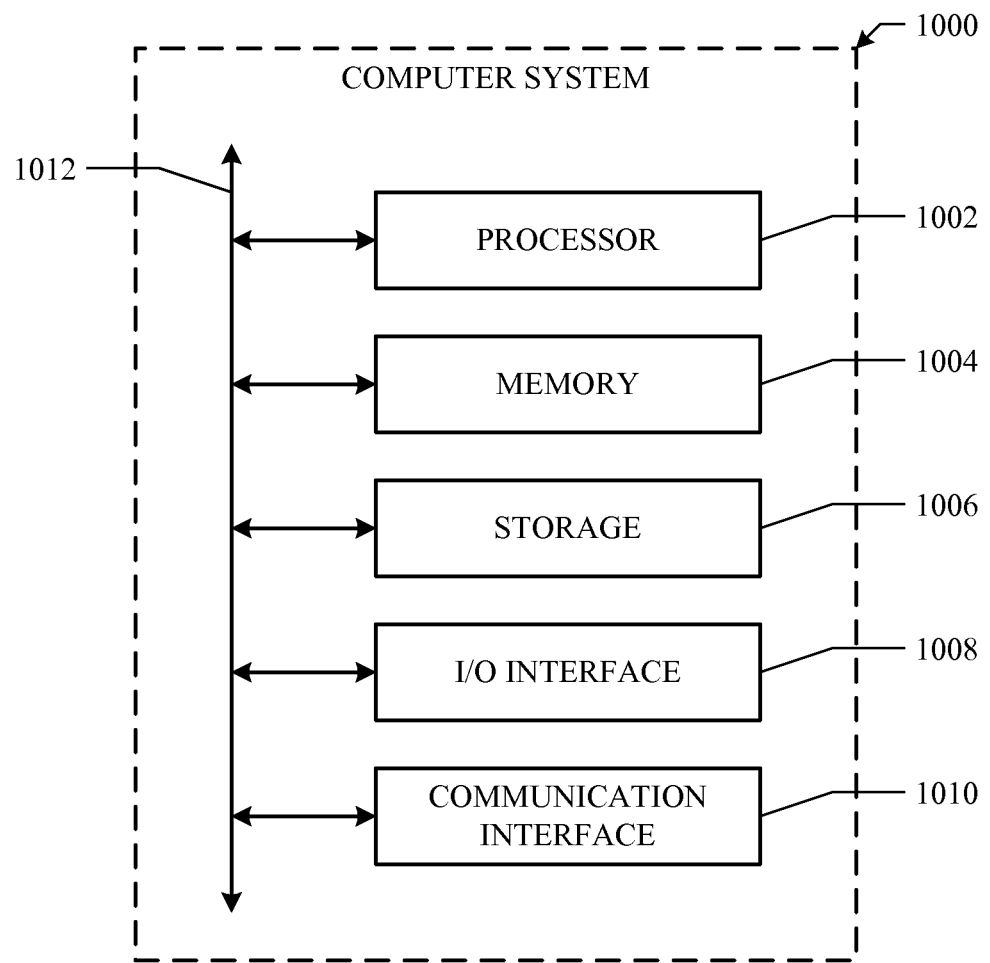
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
 by a computing device, receiving user input comprising an indication of a user's intent to generate social-network content, the social network comprising a plurality of nodes and a plurality of edges connecting the nodes, at least one node corresponding to the user;
 by the computing device, determining whether suggested content for the user to associate with the social network system exists;
 while determining whether suggested content exists, by the computing device, providing for presentation to the user an indicator comprising a first shape of a first size;
 in response to a determination that suggested content exists, determining, by the computing device, whether the suggested content exceeds a quality threshold;
 in response to a determination that the suggested content exceeds the quality threshold:
  determining, by the computing device, a likelihood that the user will interact with the suggested content;
  determining, by the computing device and based on the likelihood that the user will interact with the suggested content, a graphical emphasis for the indicator; and
  by the computing device, providing for presentation to the user the indicator comprising the first shape with the graphical emphasis, wherein when the suggested content is determined to exist and exceed the quality threshold the first shape has a second size that is larger than the first size; and
 in response to a determination that suggested content does not exist or that suggested content does not exceed the quality threshold, then, by the computing device, either determining not to provide the indicator for display or providing the indicator for display such that the indicator comprises the first shape and has a third size that is smaller than the first size.

2. One or more computer-readable non-transitory storage media embodying software that is operable when executed to:
 receive user input comprising an indication of a user's intent to generate social-network content, the social network comprising a plurality of nodes and a plurality of edges connecting the nodes, at least one node corresponding to the user;
 determine whether suggested content for the user to associate with the social network system exists;
 while determining whether suggested content exists, provide for presentation to the user an indicator comprising a first shape of a first size;
 in response to a determination that suggested content exists, determine whether the suggested content exceeds a quality threshold;
 in response to a determination that the suggested content exceeds the quality threshold:
  determine a likelihood that the user will interact with the suggested content;
  determine, based on the likelihood that the user will interact with the suggested content, a graphical emphasis for the indicator; and
  provide for presentation to the user the indicator comprising the first shape with the graphical emphasis, wherein when the suggested content is determined to exist and exceed the quality threshold the first shape has a second size that is larger than the first size; and
 in response to a determination that suggested content does not exist or that suggested content does not exceed the quality threshold, then either determine not to provide the indicator for display or provide the indicator for display such that the indicator comprises the first shape and has a third size that is smaller than the first size.

3. The media of claim 2, wherein the user input comprises interacting with a composer of social-network content on a client computing device.

4. The media of claim 3, wherein the indicator is presented on a graphical user interface of the composer.

5. The media of claim 2, wherein the first appearance further indicates whether the estimation exceeds a threshold estimation.

6. The media of claim 2, wherein the emphasis comprises a color of the indicator.

7. The media of claim 2, wherein the emphasis comprises an animation of the indicator.

8. The media of claim 2, wherein the suggested content comprises a check-in for the user.

9. The media of claim 8, wherein the quality is based at least in part on a check-in history for the user.

10. The media of claim 8, wherein the quality is based at least in part on a place associated with the check-in.

11. The media of claim 8, wherein the quality is based at least in part on a type of place associated with the check-in.

12. The media of claim 8, wherein the quality is based at least in part on a confidence associated with one or more of:
 the user's determined location; or
 a place corresponding to the user's location.

13. The media of claim 8, wherein the quality is based at least in part on a time of day associated with the check-in.

14. The media of claim 2, wherein the suggested content comprises an identification of an electronic content that the user is currently interacting with.

15. The media of claim 2, wherein the suggested content comprises an identification of an activity that the user is currently engaging in.

16. The media of claim 2, wherein the software is further operable when executed to:
 determine that a user interaction with the indictor occurred during a time that the indicator comprises the first appearance; and
 in response to the interaction, provide for display the suggested content.

17. A system comprising:
 one or more processors; and a memory coupled to the processors comprising instructions executable by the processors, the processors being operable when executing the instructions to:
  receive user input comprising an indication of a user's intent to generate social-network content, the social network comprising a plurality of nodes and a plurality of edges connecting the nodes, at least one node corresponding to the first user;
  determine whether suggested content for the user to associate with the social network system exists;
  while determining whether suggested content exists is being determined, provide for presentation to the user an indicator comprising a first shape of a first size;
  in response to a determination that suggested content exists, determine whether the suggested content exceeds a quality threshold;

in response to a determination that the suggested content exceeds the quality threshold:
  determine a likelihood that the user will interact with the suggested content;
  determine, based on the likelihood that the user will interact with the suggested content, a graphical emphasis for the indicator; and
  provide for presentation to the user the indicator comprising the first shape with the graphical emphasis, wherein when the suggested content is determined to exist and exceed the quality threshold the first shape has a second size that is larger than the first size; and
in response to a determination that suggested content does not exist or that suggested content does not exceed the quality threshold, then either determine not to provide the indicator for display or provide the indicator for display such that the indicator comprises the first shape and has a third size that is smaller than the first size.

* * * * *